United States Patent Office 3,629,357
Patented Dec. 21, 1971

3,629,357
PRODUCTION OF MALEIC ACID COPOLYMERS
AND HYDROXY DERIVATIVES THEREOF
Kazys Sekmakas, Chicago, Ill., assignor to
De Soto, Inc., Des Plaines, Ill.
No Drawing. Filed Apr. 16, 1969, Ser. No. 816,805
Int. Cl. C08f 1/00, 15/02, 27/14
U.S. Cl. 260—78.5 R                    8 Claims

ABSTRACT OF THE DISCLOSURE

Styrene or like monomer is copolymerized with maleic anhydride in the presence of water and water-miscible organic solvent to simultaneously effect copolymerization and hydrolysis and directly provide an acid copolymer which can be reacted with monoepoxide to provide derivatives having increased hydroxy functionality.

---

The present invention relates to the production of hydroxy polymers, especially from the standpoint of economically processing low cost materials in order to produce organic solvent soluble derivatives having a large proportion of hydroxy functionality based on the materials selected. More particularly, the invention is concerned with the copolymerization of vinyl monomers, such as styrene, with maleic anhydride while the anhydride functionality is simultaneously hydrolyzed to the corresponding acid. The acid copolymer so-produced is reactive with the 1,2-oxirane group as provided in an alkylene oxide to produce an hydroxy ester derivative. The fact that the maleic acid component is difunctional enables more than one hydroxy ester group to be generated for each maleic group available so that more hydroxy functionality can be generated from any given proportion of maleic anhydride. This is of special value when the number of maleic groups in the copolymer is small and when it is desired to leave a proportion of acid functionality available for purposes to be discussed hereinafter.

The copolymerization of styrene and maleic anhydride is a well known reaction and it normally produces an anhydride copolymer. While it is possible to hydrolyze the anhydride functionality to acid functionality, this is difficult to do since the polymer is a resin which is not soluble in water in the absence of a base. As a result, and where hydroxy functionality was desired, it was conventional to first react the anhydride polymer with an alcohol to form the half ester and then to react the half ester with monoepoxide to form the hydroxy ester. However, this consumes half the available acidity without producing any hydroxy functionality which is particularly disadvantageous when the polymer is of low molecular weight and only includes a few maleic groups since then the number of hydroxy groups which can be generated per molecule is less than is desired as will be explained.

It is also possible to copolymerize maleic acid or fumaric acid with styrene, but this polymerization is more difficult than is the anhydride polymerization because the acids do not have either the solubility of the anhydride or the capacity for rapid polymerization. Also, these acids are more expensive.

In the present invention, styrene or like monomer, maleic anhydride and water are dissolved in a water-miscible organic solvent and are copolymerized in the presence of free radical polymerization catalyst and at a temperature which causes the release of the desired free radicals. With the more usual catalysts, this takes place at a temperature of about 75° C. and above. Preferably, the components specified are simultaneously supplied to a preheated heel of solvent maintained at the desired elevated polymerization temperature which is desirably in excess of about 90° C. to speed the reaction. Under polymerization conditions, the anhydride functionality is hydrolyzed to the acid form by the water which is present in at least approximately stoichiometric proportion with respect to the anhydride functionality present. The water is preferably in moderate excess of the amount required to insure complete conversion to the acid form. Hydrolysis and copolymerization are substantially simultaneous.

In preferred operation of the process, the styrene component is used in excess to form a copolymer containing more than one mol of styrene per mol of maleic compound (preferably about two mols or more per mol of maleic compound). Curiously, there is complete conversion of excess styrene to copolymer, the water apparently changing the normal tendency to form heteropolymers. At the higher temperature, the copolymer which is formed is of relatively low molecular weight and therefore contains only a small number of maleic groups per copolymer molecule. In these copolymers, the capacity to convert each maleic group into a pair of hydroxy ester groups is of special value in permitting various important objectives to be achieved, particularly where a portion of the acid groups are left unreacted to permit dispersion in water with the aid of a base or to provide an internal catalyst to assist cure with aminoplast resins.

The invention is of especial importance where about two or more mols of styrene are used per mol of maleic anhydride because, when low maleic content is combined with low molecular weight, the number of available maleic groups per molecule is reduced to a minimum where the economic advantage is greatest. Moreover, and to build desired chain length in such low molecular weight resins, reliance is had in this invention on the use of organic diisocyanate which consumes hydroxy functionality and it is especially important to have enough hydroxy functionality to enable the diisocyanate to be used while leaving sufficient hydroxy functionality for an aminoplast cure and without consuming all of the copolymer acidity which is needde for internal catalysis of that cure.

It is to be noted in passing that alkylene oxide has previously been combined with copolymers containing both acid and anhydride functionalities but experience has demonstrated that when the conditions of reaction are sufficient to cause significant consumption of acid by hydroxy ester production, that the hydroxy groups so generated react with the anhydride groups to cross-link the resin and cause premature and uncontrolled gelation. Even when gel particles are not formed, the desired hydroxy functionality is unnecessarily consumed.

Accordingly, the invention requires the substantially complete conversion of the anhydride groups to acid groups which is difficult to achieve after polymer formation is completed.

The preferred monomer for reaction with maleic anhydride is styrene, but other monovinyl compounds and particularly mono-nuclear aromatic hydrocarbons including halogen derivatives thereof are useful. Styrene and vinyl toluene are especially preferred. Even lower olefins such as ethylene, propylene and butylene may be used to obtain the benefits of simultaneous copolymerization and hydrolysis so as to directly produce an acid copolymer.

The proportion of water should be sufficient to substantially entirely destroy the anhydride functionality present, a slight excess of water being preferred to insure this result. More water can be present, even to the point of causing the acid copolymer to be insoluble in the mixture of water and water-miscible organic solvent.

The specific nature of the water-miscible organic solvent is of secondary importance so long as it is either inert with respect to the monomers copolymerized and the copolymer acid formed or reactive with acid to generate hydroxy ester groups. Thus, a monoepoxide may be present in the solvent to react with the acid groups generated therein. Appropriate solvents are ketones such as methyl ethyl ketone, diethyl ketone and 4-methoxy-4-methyl-pentanone-2, pressure being used where needed to maintain the liquid phase. Ester solvents such as 2-ethoxy ethanol acetate or 2-butoxy ethanol acetate are also quite useful.

After the copolymerization has been concluded, alcoholic solvents can be added, such as butanol and the like, and the reaction with alkylene oxide in the presence of an alkaline catalyst can be carried out even though the hydroxy solvent is present. This is because the alkylene oxide in the presence of alcoholic solvent reacts preferentially with the acid groups in the copolymer. On the other hand, and when subsequent reaction with diisocyanate is intended, alcoholic solvents cannot be used.

The copolymerization is a well known one in which the monomers to be copolymerized are dissolved in the solvent medium together with appropriate free radical polymerization catalysts such as benzoyl or other peroxide or azobisisobutyronitrile with heat being used to initiate the reaction. Since rapid copolymerization is desired, reaction temperature is desirably high and such high temperature reactions are rapid and exothermic and are carried out by adding the solution of monomers in solvent containing water and catalysts progressively to a preheated heel of solvent maintained at the desired reaction temperature. Temperatures of 90° C. or higher enable rapid economical procedures to be used, but lower temperatures are also suitable, especially for batch operation.

While the monomers copolymerized preferably consist essentially of styrene or homologs thereof such as vinyl toluene, and maleic anhydride, maleic esters such as monobutyl maleate and hydroxy esters such as bis hydroxy propyl maleate may be included so long as maleic anhydride and water are present to establish the substantially simultaneous copolymerization and hydrolysis which are desired. Other monoethylenic monomers are especially ethyl acrylate or other acrylic or methacrylic esters may be present to further complex the copolymer.

The bis-hydroxy maleates are particularly desired since their presence aids in the dissolution of the maleic anhydride. While bis-hydroxy propyl maleate will be used to illustrate the class, hydroxy ethyl and hydroxy butyl counterparts may also be used to illustrate this class of bis-hydroxy alkyl maleates. The alkyl group may desirably contain up to 10 carbon atoms. On the other hand, when sufficient styrene or like monomer is used, this also eases the burden of dissolving the maleic anhydride since it is soluble in the styrene or like monomer when sufficient proportions thereof are used. The presence of solvent in the monomer mixture supplied to the reactor also helps dissolution, but it will be appreciated that the monomers can be supplied to the reactor separately, though having all of the monomers premixed in the solution constitutes the preferred practice of the invention.

Any monoepoxide may be used for reaction with the acid groups which are generated, though alkylene oxides are preferred. While the monoepoxide is preferably reacted with the preformed acid copolymer, it can be present in the solution of monomers for simultaneous reaction along with the hydrolysis and copolymerization reactions.

The monoepoxide used should be free of functional groups which would interfere with the reaction between the acid copolymer and the oxirane group of the epoxide. The preferred monoepoxides are the $C_2$–$C_4$ oxides such as ethylene oxide, propylene oxide, and butylene oxide. The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboxylic acids and especially tertiary fatty acids in the form of a glycidyl ester are quite good and provide reactive hydroxy esters which have good compatibility with water and which help to provide desirable physical properties in the final resin product. These have the formula:

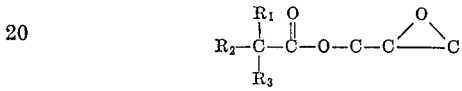

in which $R_1$ and $R_2$ are alkyl radicals having a chain length of from 2–18 carbon atoms and $R_3$ is the same as $R_1$ and $R_2$ or hydrogen. The compound in which $R_1$, $R_2$ and $R_3$ are all alkyl radicals containing from 9–11 carbon atoms is particularly preferred.

The reaction with monoepoxide is easily carried out at moderate temperatures and the reaction quickly goes to substantial completion. Appropriate temperatures are in the range of 150–350° F., preferably from 200–300° F. The epoxide may be used in stoichiometric deficiency with respect to the acid groups which are available so that desired acidity may be retained to preferably provide a final acid number in the range of from 5–50, more preferably 10–30. A small amount of an amine or other alkaline material is advantageously used in order to promote the carboxy-epoxy reaction. The consumption of the carboxyl groups in the acid copolymer is easily followed by observing the acid number of the hydroxy ester product as it is produced.

While monoepoxides, and especially alkylene oxides, are preferred to generate hydroxy functionality and enhance water dispersibility, it is also possible to use polyepoxides, especially in combination with the monoepoxide, the use of small amounts of polyepoxide, such as from 1–20% of the total weight of the epoxide component, can desirably increase molecular weight. Diepoxides such as diglycidyl ethers of bisphenols such as bis-phenol A or of aliphatic polyhydric alcohols, such as ethylene glycol, illustrate useful polyepoxides.

It is preferred to extend the chain of the hydroxy polymer by polyurethane formation because this reaction has been found to be easily controlled by regulating isocyanate addition at moderate temperature until a predetermined viscosity is reached. The reaction is with the hydroxy groups and the desired acidity of the copolymer is substantially fully retained.

The organic polyisocyanate is preferably a diisocyanate, and more preferably an aliphatic diisocyanate. The aromatic diisocyanates are useful and form a well known class which is illustrated by toluene diisocyanate. The aliphatic diisocyanates preferably include a divalent hydrocarbon radical containing at least 6 carbon atoms, preferably more than 10 carbon atoms. The hydrocarbon group may be straight, branched, or cyclic since all of these are useful in the practice of the invention. The diisocyanates are particularly preferred since higher functional compounds are troublesome with respect to gelation and water dispersibility, but can be used in small amount if care is taken.

Examples of aliphatic diisocyanates which may be used include dicyclohexane - 4,4' - diisocyanate, tetramethylene diisocyanate, hexamethylene diisocyanate, and the like. Especially desirable is 4,4' methylenebis (cyclohexyl isocyanate) which is a cycloaliphatic compound. Also useful are the diisocyanates based on fatty acid dimers such as that produced by dimerizing a C 18 fatty acid to obtain an aliphatic diisocyanate based on a 36 carbon divalent hydrocarbon radical.

While the invention broadly contemplates the use of up to 20% by weight of diisocyanate, based on the weight of the hydroxy ester copolymer, it is preferred that a smaller proportion be used, the preferred proportions on the same basis ranging from 0.25-10% by weight. Most preferably, from 0.5-4% of diisocyanate is used. Of course, a stoichiometric deficiency of diisocyanate is essential and it is preferred to use a ratio of hydroxy to isocyanate of from 2:1 to 50:1, preferably from 4:1 to 30:1.

The aliphatic diisocyanates are particularly preferred because they contribute superior color properties.

The resins of the invention preferably include unreacted acid groups since these enable the resin to be dispersed in water with the aid of a base. These acid groups also are valuable in providing an internal catalysis of the cure which will be discussed hereinafter, and they enable electrodeposition from aqueous dispersion which will also be discussed hereinafter.

The resins of the invention are preferably cured using an aminoplast resin. The term "aminoplast resin" is a common one used to define heat-hardening condensation products of amines and especially triazines with excess formaldehyde. Condensation products of excess formaldehyde with melamine, benzoguanamine, and urea constitute typical aminoplast resins and the resins of the invention exhibit good compatibility with such materials. The condensation reaction, as is well known, is normally carried out in alcoholic solvent medium, such as methanol, ethanol, butanol or higher alcohol. Broadly, the methylol groups of the aminoplast react with the hydroxy groups of the copolymer hydroxy ester to provide the cure. When the copolymer is dispersed in water and electrodeposited the aminoplast may be used in water soluble or water dispersible form and proportions of 1-40%, preferably 5-30%, based on total resin, are used to form films which cure when baked at moderate temperature. Water insoluble aminoplast resins are particularly preferred for electrocoating in accordance with the invention, e.g., benzoguanamine-formaldehyde condensates.

It is to be stressed that the acidity of the partial hydroxy ester is especially significant since it enables dispersion in water with the aid of a base, enhances compatibility and catalyzes the aminoplast cure. In turn, the aminoplast cure is aided by the presence of an adequate hydroxy functionality in the resinous hydroxy ester.

The films deposited in accordance with the invention are baked to cure the same. Appropriate baking temperatures are from 300°-500° F. for periods varying from about 30 seconds at the highest baking temperatures to about an hour at the lowest temperatures.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio for electrocoat application is substantially 0.4:1, though this ratio may vary from 0.1:1 to 1:1 or higher, with values of 0.3:1 to 0.5:1 being more usual. The only caution to be observed is to avoid those pigments which are unduly sensitive to water. Corrosion resistant pigments may be used, but this is not essential. For solvent application, conventional pigmentation is fully appropriate.

For electrodeposition in accordance with the invention, the resins are dispersed in water, preferably using a nitrogenous base, such as an amine, e.g., triethyl amine, with the pH of the aqueous bath being approximately in the range of from about pH 6 to about pH 11, preferably pH 7.5 to 10. The aqueous electrocoating bath has a resin solids content of from 1-20%, preferably from 5-15%.

The invention is illustrated in the examples which follow in which all parts are by weight.

EXAMPLE 1

Preparation of a 1:1 styrene-maleic acid polymer and conversion to hydroxy resin monomer premix

| | |
|---|---:|
| Styrene (2 moles) | 208 |
| Maleic anhydride (2 moles) | 196 |
| Distilled water | 50 |
| 4-methoxy-4-methyl-pentanone-2 | 260 |
| Azobisisobutyronitrile | 3 |
| Total—Referred to below as "monomer premix A" | 717 |

Procedure of preparation

| | |
|---|---:|
| Monomer premix A | 200 |
| 4-methoxy-4-methyl-pentanone-2 | 100 |
| Azobisisobutyronitrile | 2 |

Charge the above into a reactor and heat to 90° C. Hold for 30 minutes.

| | |
|---|---:|
| Monomer premix A | 517 |
| Azobisisobutyronitrile | 2 |

Add the above to the reactor over a 1 hour period at 100-105° C. Hold for 1 hour.

2 azobisisobutyronitrile—Add catalyst and hold for one hour. Acid value: 274.

| | |
|---|---:|
| 2-ethoxy ethanol | 300 |
| Triethyl amine | 10 |

Add solvent and amine.

| | |
|---|---:|
| Butylene oxide | 288 |

Add butylene oxide to reactor over a 60 minute period and hold for an acid value of 10-13.

The final characteristics of the resin are:

| | |
|---|---:|
| Solids (percent) | 51.2 |
| Viscosity | $Z_2$–$Z_3$ |
| Acid value | 11.4 |

The above hydroxy polymer was easily dispersible in water with the aid of triethyl amine or like base, and water solutions containing the same can be mixed with water-soluble aminoplast resins such as hexamethoxy methyl melamine and cured by baking, e.g., for 20 minutes at 350° F.

EXAMPLE 2

Preparation of polymer containing high proportion of styrene (styrene:maleic anhydride ratio 4:1)

Materials: Parts (1)

2-ethoxy ethanol acetate ___ 340

Charge (1) into reactor. Heat to 155° C. using light nitrogen sparge.

(2)

| | |
|---|---:|
| Styrene (4 mols) | 416 |
| Maleic anhydride (1 mol) | 98 |
| Azobisisobutyronitrile | 15 |

Dissolve maleic anhydride in styrene and add azobisisobutyronitrile catalyst.

(3)

Distilled water (1.22 mol) ___ 22

Feed (2) and (3) continuously into the reactor over a 1½–2 hour period. Hold for 1 hour.

(4)

Tertiary-butyl perbenzoate ___ 3

Add (4) and hold one hour to complete monomer conversion.

(5)

Tertiary amine _____ 20

Add (5)

(6)

Butylene oxide _____ 140

Add (6) over 20 minute period to reactor. Hold for an acid value of less than 20.

The final characteristics of the polymer are:

Solids (percent) _____ 65.5
Viscosity (Gardner) _____ $Z_{6\pm}$
Acid value _____ 18.5

Evaluation of the polymer of Example 2

The polymer solution of Example 2 was blended with heat-hardening butylated benzoguanamine-formaldehyde condensate and epoxy resin.

The resin composition, based on resin solids, was:

| | Percent |
|---|---|
| Hydroxy polymer of Example 2 | 60 |
| Butylated benzoguanamine-formaldehyde condensate | 30 |
| Epoxy resin (diglycidyl ether of bisphenol A having an expoxide equivalent weight of 450) | 10 |
| | 100 |

Films prepared from a blend of the above were drawn on steel panels and baked for 20 minutes at 375° F. The thickness of the films was 0.9 mil. The following results were obtained:

Adhesion to metal _____ Excellent.
Pencil hardness _____ 4H–5H.
Forward impact _____ 30 inch/lbs.
Flexibility (conical mandrel) _____ Pass ¼".
Toluol resistance _____ Excellent.
Recoat adhesion _____ Very good.

As the above results indicate, the coatings prepared utilizing the hydroxy functional resins of the invention have good compatibility, cure, hardness, flexibility and adhesion properties.

EXAMPLE 3.—PART A

Preparation of styrene-maleic resin

| Monomer premix: | Parts by wt. |
|---|---|
| 4-methoxy-4-methyl-pentanone-2 | 450 |
| Styrene (1.5 mols) | 155 |
| Maleic anhydride (0.451 mol) | 45 |
| Water | 25 |
| Bishydroxy propyl maleate (0.72 mol) | 165 |
| Butyl acrylate | 80 |
| Azobisisobutyronitrile | 10 |
| Total | 930 |

Mix all monomers until the maleic anhydride dissolves. Then add azobisisobutyronitrile catalyst.

Procedure of polymerization

Charge 250 parts of the above monomer premix into a 3 liter reactor and heat to 90° C. Hold for 15 minutes. Then start addition of the remaining 680 parts of monomer premix which is added over a 60 minute period to the reactor. During addition, the temperature is gradually increased to 115–120° C. Hold for one hour. Add 2 additional parts of azobisisobutyronitrile and hold for an additional hour at 115° C.

The final characteristics of the acid polymer are:

Solids (percent) _____ 37.4
Viscosity (Gardner) _____ H–I
Acid value _____ 115.5

EXAMPLE 3.—PART B

Preparation of hydroxy urethane resin

| Charge composition: | Parts |
|---|---|
| Acid polymer of Example 3, Part A (acid value 115.5) | 600 |
| Triethyl amine | 20 |

Charge the above into a reactor equipped with a stirrer, thermometer, nitrogen inlet tube and separatory funnel. Heat to 110° C.

Butylene oxide _____ 65

Add butylene oxide over a 20–30 minute period and hold for an acid value of less than 10.0. Dehydrate the resin by distilling off traces of water and solvent (100 parts so-removed).

4-methoxy-4-methyl-pentanone-2 _____ 100
Toluene diisocyanate _____ 10

Add the 4-methoxy-4-methyl-pentanone-2 and toluene diisocyanate and hold for 30 minutes.

The final characteristics of the polymer are:

Solids (percent) _____ 45.3
Viscosity (Gardner) _____ Y
Acid value _____ 6.7

Evaluation of the urethane resin of

Example 3.—Part B

The polymer solution of Example 3. Part B, containing 45.3% solids and having an acid value of 6.7 was blended with 20% by weight of water-soluble melamine resin (hexamethoxy methyl melamine).

Films of the above coating were drawn on steel panels and baked for 20 minutes at 350° F. The thickness of the films was one mil.

The following results were obtained:

Adhesion to metal _____ Excellent.
Pencil hardness _____ 3H.
Forward impact _____ 50 (in./lbs.).
Flexibility (conical mandrel) _____ Pass ⅛".
Toluol resistance _____ Excellent.
Recoat adhesion _____ Excellent.

Instead of using diisocyanate as described above, the isocyanate in Example 3—Part B can be omitted and the 65 parts of butylene oxide replaced by a mixture of 40 parts of butylene oxide and 15 parts of a diglycidyl ether of bisphenol A having an epoxide equivalent weight of 190. Approximately comparable results are obtained when the product is blended with melamine resin as described in the evaluation of Example 3—Part B.

The invention is defined in the claims which follow.

I claim:

1. A method of producing an acid copolymer comprising copolymerizing maleic anhydride with a vinyl monomer copolymerizable therewith in solution in water-miscible organic solvent maintained at an elevated polymerization temperature and containing free radical polymerization catalyst and sufficient water to substantially completely hydrolyze said maleic anhydride to acid.

2. A method as recited in claim 1 in which said vinyl monomer is styrene or a homolog thereof.

3. A method of producing an acid copolymer comprising simultaneously feeding maleic anhydride, vinyl monomer copolymerizable therewith, free radical polymerization catalyst, water-miscible organic solvent and sufficient water to substantially completely hydrolyze said maleic anhydride to acid, to a heel comprising said solvent maintained at a temperature of at least about 75° C. in order to substantially simultaneously effect copolymerization and hydrolysis.

4. A method as recited in claim 3 in which said vinyl monomer is styrene.

5. A method as recited in claim 3 in which said vinyl monomer is styrene, vinyl toluene or mixture thereof present in an amount of at least about 2 mols thereof per mol of maleic anhydride.

6. A method as recited in claim 5 in which said heel comprising solvent is maintained at a temperature of at least about 90° C.

7. A method as recited in claim 3 in which said water is present in excess of a stoichiometric amount based on complete conversion of said maleic anhydride to acid.

8. A method as recited in claim 3 in which the materials supplied to said heel include bis hydroxy alkyl maleate.

References Cited

UNITED STATES PATENTS

| 2,565,147 | 8/1951 | Pfluger | 260—78.5 |
| 3,178,395 | 4/1965 | Muskat | 260—78.5 |
| 3,250,734 | 5/1966 | Sekmakas | 260—23 |
| 3,270,088 | 8/1966 | Hicks | 260—851 |

JOSEPH L. SCHOFER, Primary Examiner

J. KIGHT, III, Assistant Examiner

U.S. Cl. X.R.

260—77.5 CR, 834, 836